United States Patent
Hart et al.

(10) Patent No.: US 12,553,514 B1
(45) Date of Patent: Feb. 17, 2026

(54) SYSTEM AND APPARATUS FOR LUBRICATION OF A HYBRID TRANSMISSION

(71) Applicant: GM GLOBAL TECHNOLOGY OPERATIONS LLC, Detroit, MI (US)

(72) Inventors: James M. Hart, Belleville, MI (US); Shawn H. Swales, Farmington, MI (US); Matthew J. Laskaska, Essexville, MI (US); John A Diemer, Royal Oak, MI (US); Michael M. Ilievski, Macomb Twp., MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/973,918

(22) Filed: Dec. 9, 2024

(51) Int. Cl.
*F16H 57/04* (2010.01)
*F16H 3/72* (2006.01)

(52) U.S. Cl.
CPC ....... *F16H 57/043* (2013.01); *F16H 57/0427* (2013.01); *F16H 57/0436* (2013.01); *F16H 57/0484* (2013.01); *F16H 3/728* (2013.01)

(58) Field of Classification Search
CPC ..... F16H 57/043; F16H 57/0427; F16H 3/727
See application file for complete search history.

(56) References Cited

U.S. PATENT DOCUMENTS

| | | | |
|---|---|---|---|
| 6,478,705 B1 | 11/2002 | Holmes | |
| 6,527,658 B2 | 3/2003 | Holmes | |
| 7,022,038 B2 | 4/2006 | Schmidt | |
| 7,217,211 B2 | 5/2007 | Klemen | |
| 7,427,252 B2 | 9/2008 | Holmes | |
| 7,544,141 B2 * | 6/2009 | Holmes | B60K 6/40 475/5 |
| 8,317,648 B2 | 11/2012 | Robinette | |
| 8,585,520 B2 | 11/2013 | Turnbull | |
| 8,905,885 B2 * | 12/2014 | Yamamoto | B60K 6/26 184/6.12 |
| 9,840,140 B1 * | 12/2017 | Holmes | F16H 3/728 |
| 9,933,066 B2 * | 4/2018 | Sada | F16H 57/04 |
| 10,011,261 B2 * | 7/2018 | Kawai | B60W 10/08 |
| 10,017,045 B1 | 7/2018 | Swales | |
| 10,854,933 B2 * | 12/2020 | Hao | B60L 3/0046 |
| 2003/0064846 A1 | 4/2003 | Klemen et al. | |

(Continued)

FOREIGN PATENT DOCUMENTS

| | | |
|---|---|---|
| DE | 69737312 T2 | 11/2007 |
| DE | 102014117744 A1 | 3/2016 |

(Continued)

*Primary Examiner* — Derek D Knight
(74) *Attorney, Agent, or Firm* — Quinn IP Law

(57) ABSTRACT

An input split hybrid transmission that has a planetary gearset that is arranged to transfer mechanical power between an internal combustion engine, a first electric machine, a second electric machine, and an output member; and a fluidic distribution system, wherein the planetary gearset includes a sun gear, a plurality of planetary pinion gears arranged on a planetary carrier, and a ring gear. The planetary carrier is arranged on a first rotatable input member that defines a first axis. The first rotatable input member has an axial conduit. The fluidic distribution system is arranged to supply a lubricant to the planetary gearset via the axial conduit disposed within the first rotatable input member.

20 Claims, 7 Drawing Sheets

(56) References Cited

U.S. PATENT DOCUMENTS

2015/0226297 A1  8/2015  Knoblauch et al.
2016/0265652 A1  9/2016  Nishimine

FOREIGN PATENT DOCUMENTS

| JP | 2009086367 A | 12/2009 |
| JP | 2014024412 A | 2/2014 |
| JP | 2014052065 A | 3/2014 |
| JP | 20220077781 A | 5/2022 |

* cited by examiner

SYSTEM AND APPARATUS FOR LUBRICATION OF A HYBRID TRANSMISSION

INTRODUCTION

Hybrid powertrain systems generate propulsion torque from two or more energy sources, e.g., hydrocarbon-based fuels through an internal combustion engine, and electric power through one or more electric machines, with electric power stored in a DC power source.

SUMMARY

The concepts described herein provide a fluidic distribution system for a hybrid transmission, which includes providing pressurized lubricant to elements of a planetary gearset in one embodiment.

This includes, in one embodiment, a fluidic distribution system for an input split hybrid transmission architecture wherein positive pressure oil lubrication is provided for a full complement of planetary pinion bearings of pinion gears through use of an externally-disposed fluidic transfer device having a cover plate and a radial tube, with a sealed oil feed between a planetary carrier for a planetary gearset and a rotatable input member. Lubricating fluid is regulated along the entire length of a rotatable input member through use of a single oil passage or conduit, and tunable passages that are downstream of the single oil passage. This includes lubricating fluid being fed from a stationary component to a rotating component through use of a single dynamic oil feed seal, which includes a cover plate and a single banjo fitting in one embodiment.

An aspect of the disclosure may include an input split hybrid transmission that has a planetary gearset that is arranged to transfer mechanical power between an internal combustion engine, a first electric machine, a second electric machine, and an output member; and a fluidic distribution system, wherein the planetary gearset includes a sun gear, a plurality of planetary pinion gears arranged on a planetary carrier, and a ring gear. The planetary carrier is arranged on a first rotatable input member that defines a first axis. The first rotatable input member has an axial conduit. The fluidic distribution system is arranged to supply a lubricant to the planetary gearset via the axial conduit disposed within the first rotatable input member.

Another aspect of the disclosure may include a transmission case having an outer portion, a first side portion, and an engine side portion; wherein the planetary gearset is arranged in the transmission case; wherein the first rotatable input member extends between the first side portion and the engine side portion, and includes a first end thereof projecting through the first side portion; and wherein the first end of the first rotatable input member includes an orifice fluidly coupled to the axial conduit disposed therein.

Another aspect of the disclosure may include the fluidic distribution system having a longitudinal conduit arranged within the transmission case, a banjo bolt, an externally-disposed fluidic transfer device having a cover plate and a radial tube, the axial conduit being disposed within the first rotatable input member, and a first radial conduit disposed within the first rotatable input member, wherein the first radial conduit is in fluidic communication with the axial conduit. The cover plate is sealably secured to the first side portion of the transmission case overtop of the axial conduit disposed within the first rotatable input member such that a first end of the radial tube fluidly communicates with the axial conduit; a second end of the radial tube is secured to the transmission case via the banjo bolt such that the second end of the radial tube fluidly communicates with the longitudinal conduit; the lubricant is supplied from a pressurized source that is fluidly connected to the longitudinal conduit; and the lubricant flows from the pressurized source to the planetary gearset via the longitudinal conduit arranged within the transmission case, the banjo bolt, the cover plate including the radial tube, the axial conduit disposed within the first rotatable input member, and the first radial conduit is disposed within the first rotatable input member.

Another aspect of the disclosure may include the first rotatable input member having a splined portion; wherein the axial conduit arranged within the first rotatable input member extends between a first end thereof and the splined portion; and the first rotatable input member has a first radial conduit, wherein the first radial conduit is arranged between the axial conduit and an outer surface of the first rotatable input member at the splined portion.

Another aspect of the disclosure may include the first rotatable input member having a plurality of second radial conduits that are arranged between the axial conduit and an outer surface of the first rotatable input member that is away from the splined portion.

Another aspect of the disclosure may include the splined portion of the first rotatable input member being intersplined with the planetary carrier; wherein the planetary carrier includes a third radial conduit that aligns with the first radial conduit.

Another aspect of the disclosure may include the fluidic distribution system being arranged to supply the lubricant to the planetary gearset via the axial conduit disposed within the first rotatable input member, the first radial conduit, and the third radial conduit.

Another aspect of the disclosure may include the fluidic distribution system being arranged to supply the lubricant to one of the sun gear, the plurality of planetary pinion gears, the planetary carrier, and the ring gear via the axial conduit disposed within the first rotatable input member.

Another aspect of the disclosure may include a transmission for a powertrain system having a simple planetary gearset arranged to transfer mechanical power between a first torque generating device, a second torque generating device, a third torque generating device, and an output member, and a fluidic distribution system. The simple planetary gearset includes a sun gear, a plurality of planetary pinion gears arranged on a planetary carrier, and a ring gear; wherein the planetary carrier is arranged on a first rotatable input member defining a first axis; wherein the first rotatable input member has an axial conduit disposed therein; and wherein the fluidic distribution system is arranged to supply a lubricant to the planetary gearset via the axial conduit disposed within the first rotatable input member.

Another aspect of the disclosure may include an input split hybrid transmission for a powertrain system of a vehicle having a simple planetary gearset arranged to transfer mechanical power between an internal combustion engine, a first electric machine, a second electric machine, and an output member coupled to a driveline of the vehicle; and a fluidic distribution system. The planetary gearset includes a sun gear, a plurality of planetary pinion gears arranged on a planetary carrier, and a ring gear; wherein the planetary carrier is arranged on a first rotatable input member defining a first axis; wherein the first rotatable input member has an axial conduit disposed therein; and wherein the fluidic distribution system is arranged to supply a lubricant to the planetary gearset via the axial conduit disposed within the first rotatable input member.

The above summary is not intended to represent every possible embodiment or every aspect of the present disclosure. Rather, the foregoing summary is intended to illustrate some of the aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

Figure 1:
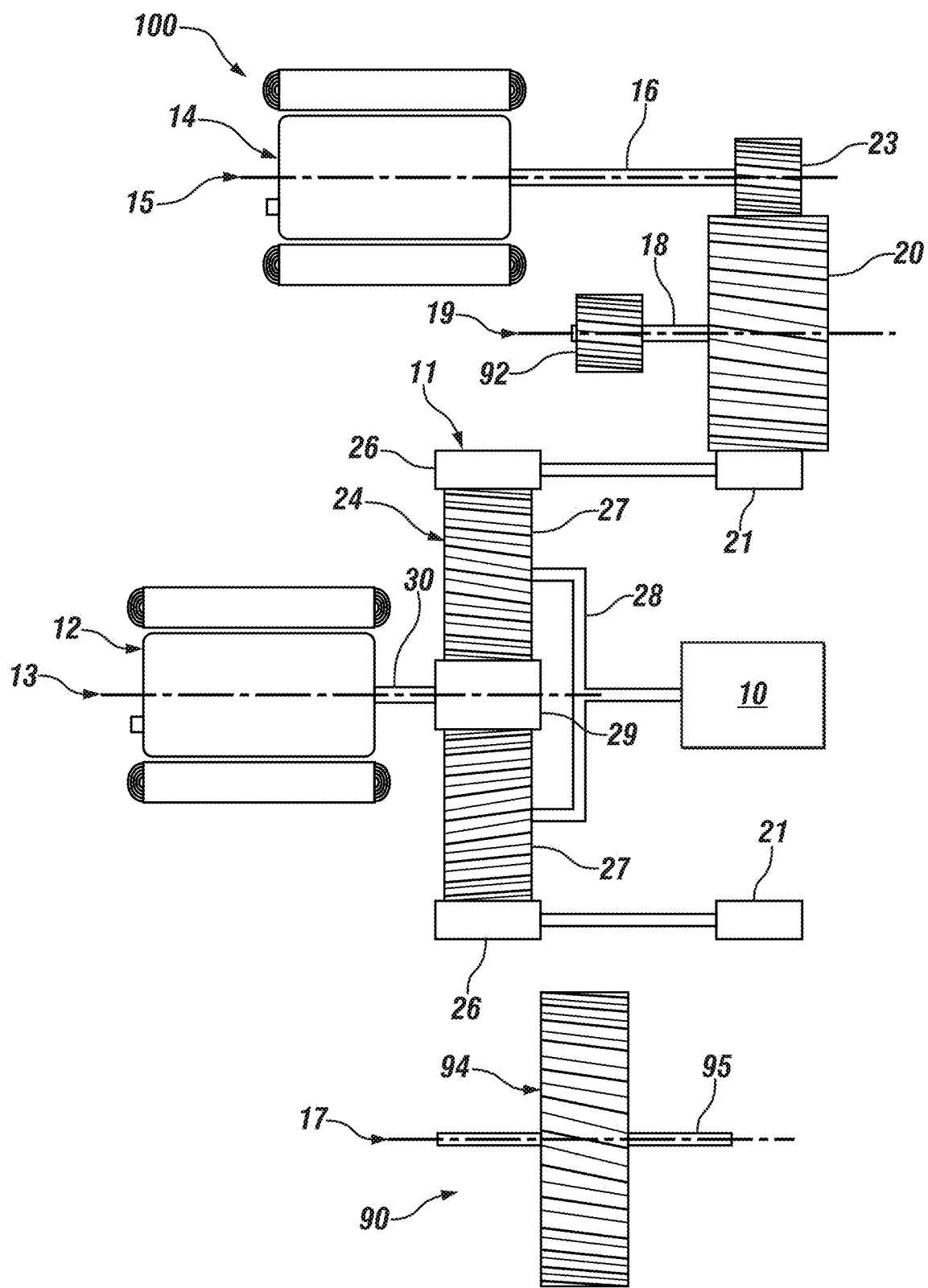
FIG. 1 schematically illustrates an embodiment of a powertrain system having an internal combustion engine coupled to an input split hybrid transmission, in accordance with the disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

For purposes of convenience and clarity, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

The following detailed description is merely illustrative in nature and is not intended to limit the application and uses. Furthermore, there is no intention to be bound by an expressed or implied theory presented herein. It should be understood that throughout the drawings, corresponding reference numerals indicate like or corresponding parts and features.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

The use of ordinals such as first, second and third does not necessarily imply a ranked sense of order, but rather may distinguish between multiple instances of an act or structure.

All numerical values of parameters (e.g., of quantities or conditions) in this specification, including the appended claims, are to be understood as being modified by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters.

When an element is "fixed on" or "disposed on" another element, the element may be attached to another element directly or by using an intermediate element. When an element is considered as "connected to" or "coupled to" another element, the element may be connected to the other element directly or by using an intermediate element. As used in this specification, the terms "vertical", "horizontal", "left", "right" and similar expressions are intended for description.

Unless otherwise defined, technical and scientific terms used herein have the same meanings as commonly understood by those skilled in the art to which the present disclosure pertains. The terms used herein are intended for describing specific implementations, and not limiting. As used in this specification, the term "and/or" includes combinations of one or more associated listed items.

Referring now to the drawings, which are provided for the purpose of illustrating certain embodiments and not for the purpose of limiting the same, FIG. 1 schematically illustrates a hybrid powertrain system 100 that includes an internal combustion engine 10, an input split hybrid transmission 11, a first electric machine (Motor A) 12, a second electric machine (Motor B) 14, and a final drive system 90 having an output member 95. The internal combustion engine 10, the first electric machine 12, and second electric machine 14 are non-limiting examples of torque generating devices, and may be replaced by other combinations and arrangements of torque generating devices.

The hybrid powertrain system 100 may be deployed on a vehicle to provide tractive effort in one embodiment, although the concepts described herein are not so limited.

When deployed on a vehicle, the vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The input split hybrid transmission 11 has a planetary gearset 24 and the final drive system 90, which may be coupled to a driveline of a vehicle to provide tractive effort.

The planetary gearset 24 is arranged as a simple planetary gearset in one embodiment, although the concepts described herein are not so limited. The planetary gearset 24 includes a sun gear 29, a plurality of planetary pinion gears 27 arranged on and rotatably coupled to a planetary carrier 28, and a ring gear 26, which meshingly engage and rotate in concert.

The sun gear 29 is arranged on a first rotatable input member 30 that defines a first axis 13. The first rotatable input member 30 also serves as a rotor shaft for the first electric machine 12.

The planetary carrier 28 is coupled to an output member or crankshaft of the internal combustion engine 10, and may include an intervening torque converter or other torque management device.

The ring gear 26 couples to and rotates with an extension ring gear 21.

The second electric machine 14 has a rotor that is arranged on a second input member 16 and defines a second axis 15. The second input member 16 has a motor pinion 23.

The motor pinion 23 of the second input member 16 and the extension ring gear 21 of the ring gear 26 both meshingly engage and rotate with a transfer gear 20, which is arranged on a transfer member 18.

The final drive 90 includes final drive pinion gear 92, and a final drive ring gear 94, which is coupled to and rotates with output member 95.

The transfer gear 20 is coupled to and rotates with the final drive pinion gear 92.

The first input member 30 defines a first axis 13, the second input member 16 defines a second axis 15, the transfer member 18 defines a transfer axis 19, and the output member 95 defines a third axis 17. The first input member 30, the second input member 16, the transfer member 18, and the output member 95 are rotatable shaft elements that are arranged on corresponding first axis 13, second axis 15, transfer axis 19, and third axis 17, which are arranged in parallel.

This arrangement of the planetary gearset 24 and the final drive system 90 advantageously transfer torque between the internal combustion engine 10, the first electric machine 12, the second electric machine 14, and the output member 95 for tractive torque and/or electrical charging without having clutches.

Figure 2:
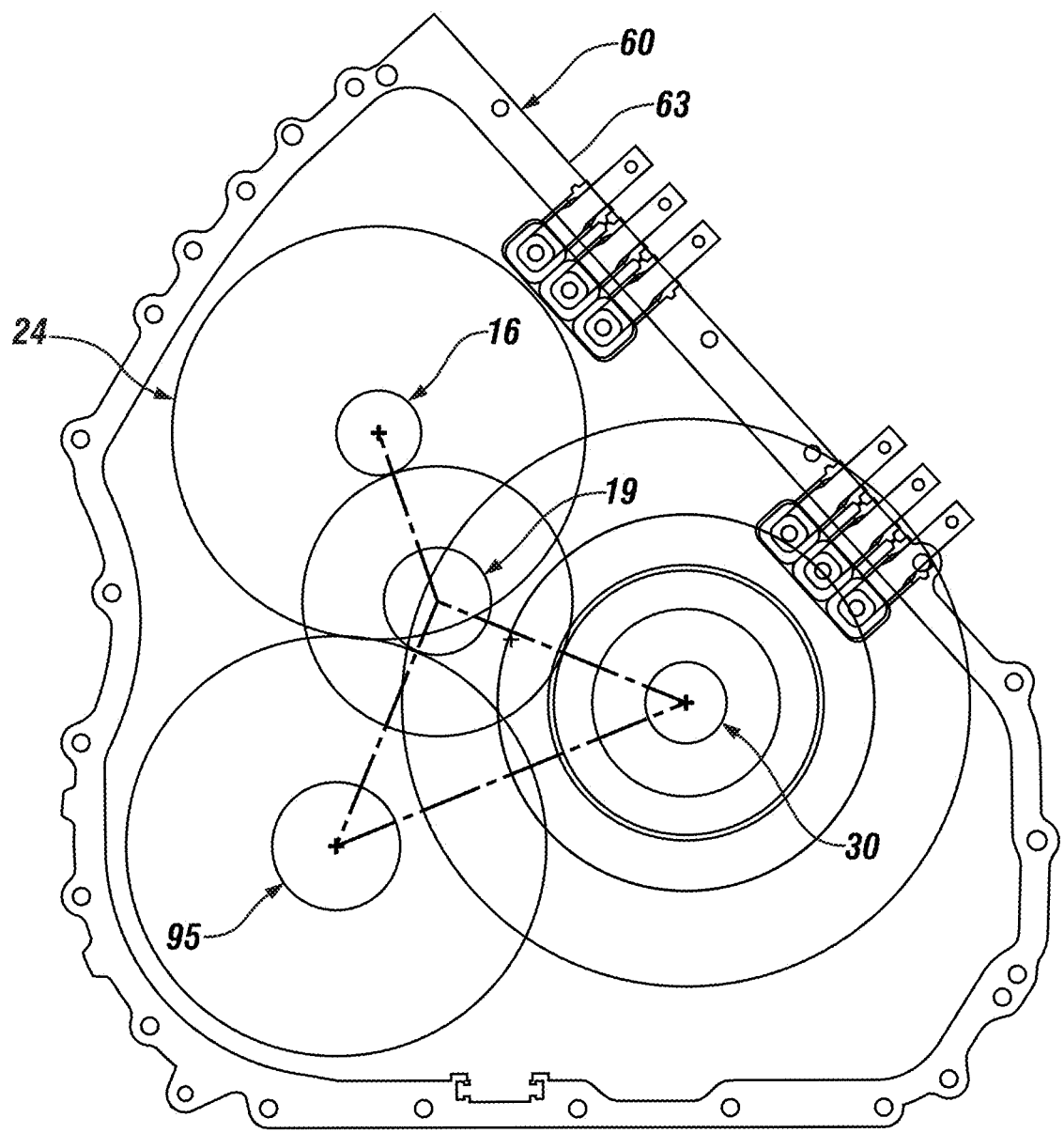
FIG. 2 schematically illustrates a cutaway end view of an embodiment of an input split hybrid transmission, in accordance with the disclosure.
Figure 3:
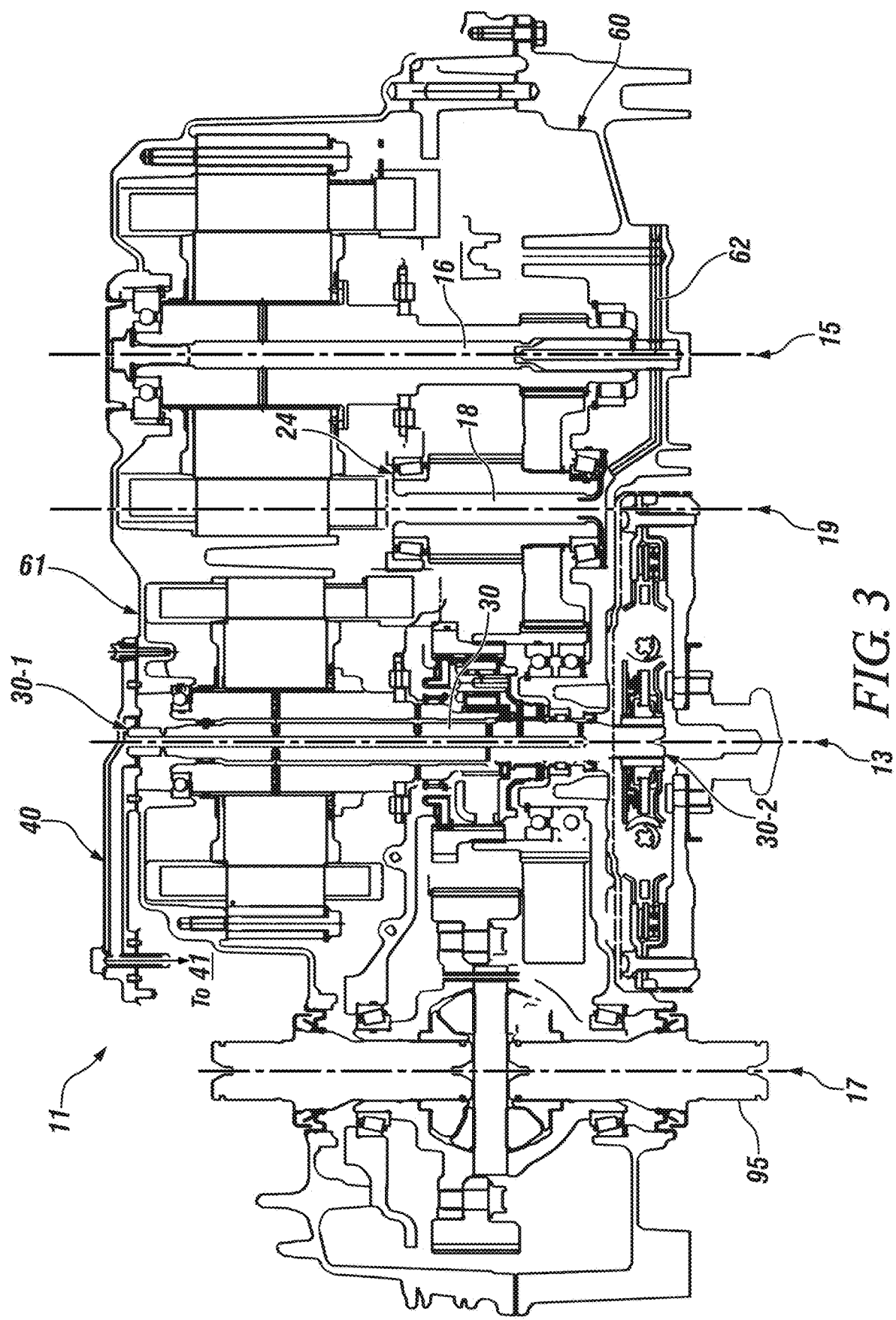
FIG. 3 schematically illustrates a cutaway side view of an embodiment of an input split hybrid transmission, in accordance with the disclosure.

FIGS. 2 and 3 schematically illustrate a cutaway end view (FIG. 2) and corresponding cutaway midline side view (FIG. 3) of an embodiment of the input split hybrid transmission 11 that is described with reference to FIG. 1, with like numerals indicating like elements in the various views. FIG. 2 depicts an arrangement of elements of the input split hybrid transmission 11, including the first input member 30, the second input member 16, the transfer member 18, and the output member 95 and associated elements are housed in a transmission case 60 that includes an outer housing portion 63 (illustrated in FIG. 2), a first side portion 61 that is arranged on a first side of the outer housing portion 63, and an engine side portion 62 that is arranged on a second, opposite side of the outer housing portion 63.

FIG. 3 further illustrates elements of a fluid distribution system 40, which is arranged to supply a pressurized lubricant to elements of the input split hybrid transmission 11 that are housed within the transmission case 60, including elements of the planetary gearset 24 and the final drive 90.

The fluid distribution system 40 is arranged to distribute pressurized lubricant that originates from an in-house fluidic pump and sump 41.

The first input member 30 is a rigid shaft that includes a first end 30-1 and a second end 30-2. The first input member 30 defines an internal axial conduit 32 that is concentric to the first axis 13 and extends from an opening 31 in the first end 30-1 to near the second end 30-2.

The first input member 30 is arranged in the transmission case 60 with a portion of the first end 30-1 extending through an orifice in the first side 61 of the transmission case 60, with the opening 31 in the first end 30-1 being disposed outside of the first end 30-1 of the transmission case 60.

Figure 6:
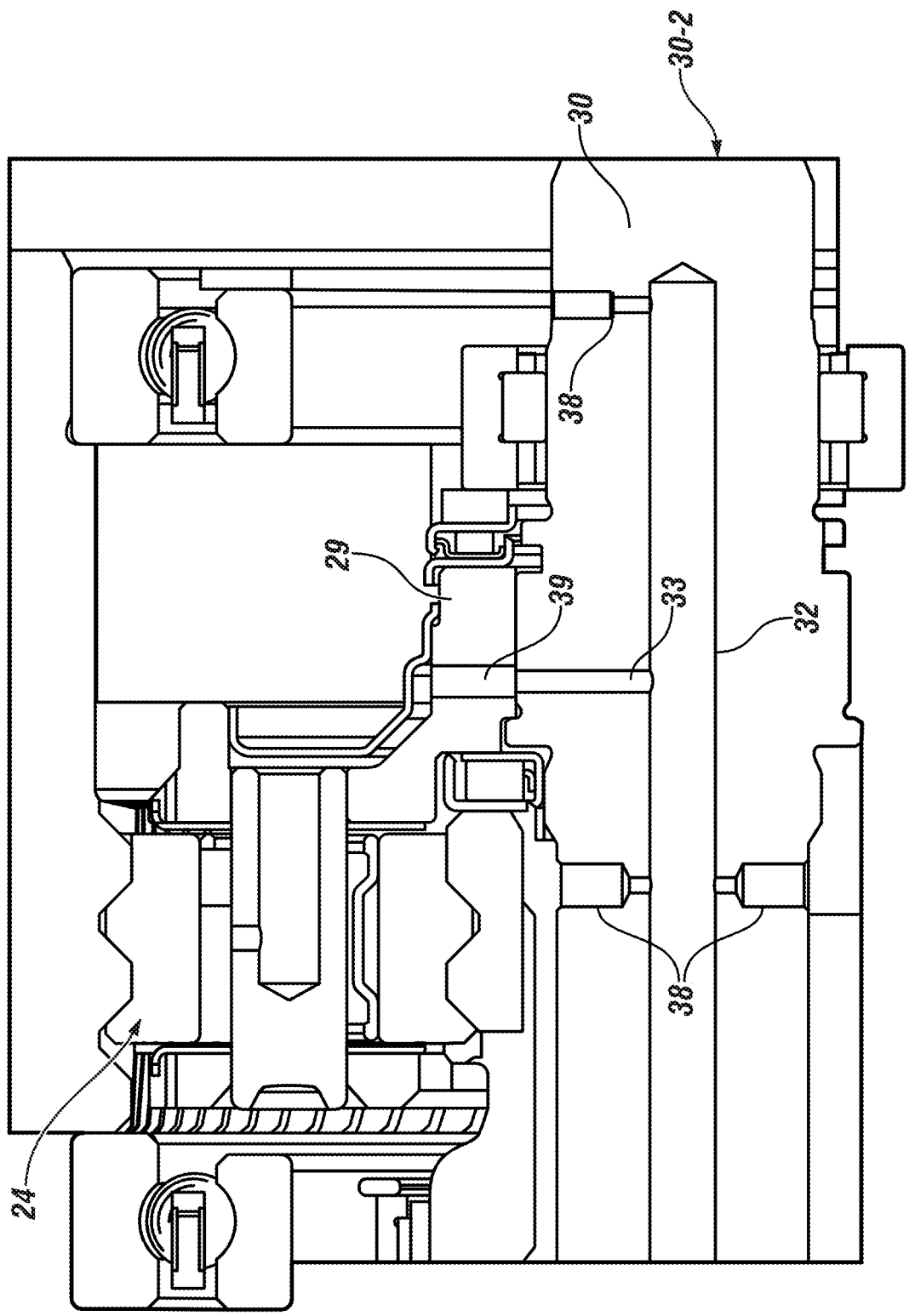
FIG. 6 schematically illustrates a cutaway side view of a portion of an embodiment of an input split hybrid transmission, in accordance with the disclosure.

The first input member 30 includes a splined portion 34 that is proximal to the second end 30-2, as illustrated with reference to FIGS. 3, 6, and 7.

Referring again to FIG. 3, the first input member 30 includes at least one of or a plurality of radial conduits that extend between the internal axial conduit 32 and an outer surface of the first input member 30, thus enabling fluidic flow via fluidic pressure or centrifugal force. The radial conduits include a first radial conduit 33 that is disposed in the first input member 30 at the splined portion 34, as also illustrated with reference to FIG. 6.

The radial conduits include one or a plurality of second radial conduits 38 that are disposed in the first input member 30 at selected locations along the length thereof, as illustrated with reference to FIGS. 6 and 7. The specific locations, diameters, and other design details are application-specific, and are selected to achieve distribution of fluid, e.g., lubricating oil, to various elements of the transmission 11 while minimizing losses associated with sealing of passages and providing for centrifugal lubrication along the entire length of the axis of the first input member 30.

Figure 4:
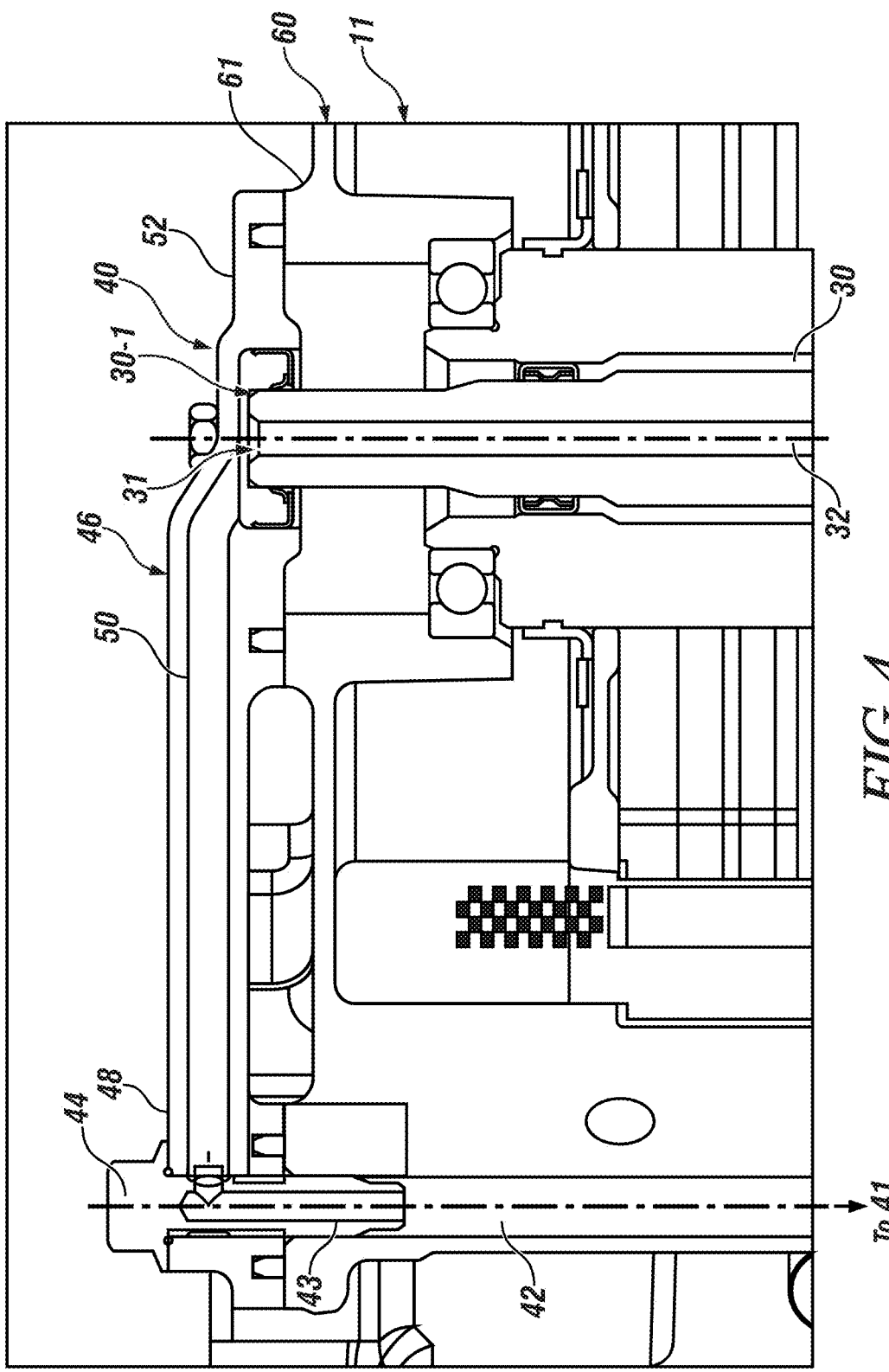
FIG. 4 schematically illustrates a cutaway side view of a portion of an embodiment of an input split hybrid transmission, in accordance with the disclosure.
Figure 5:
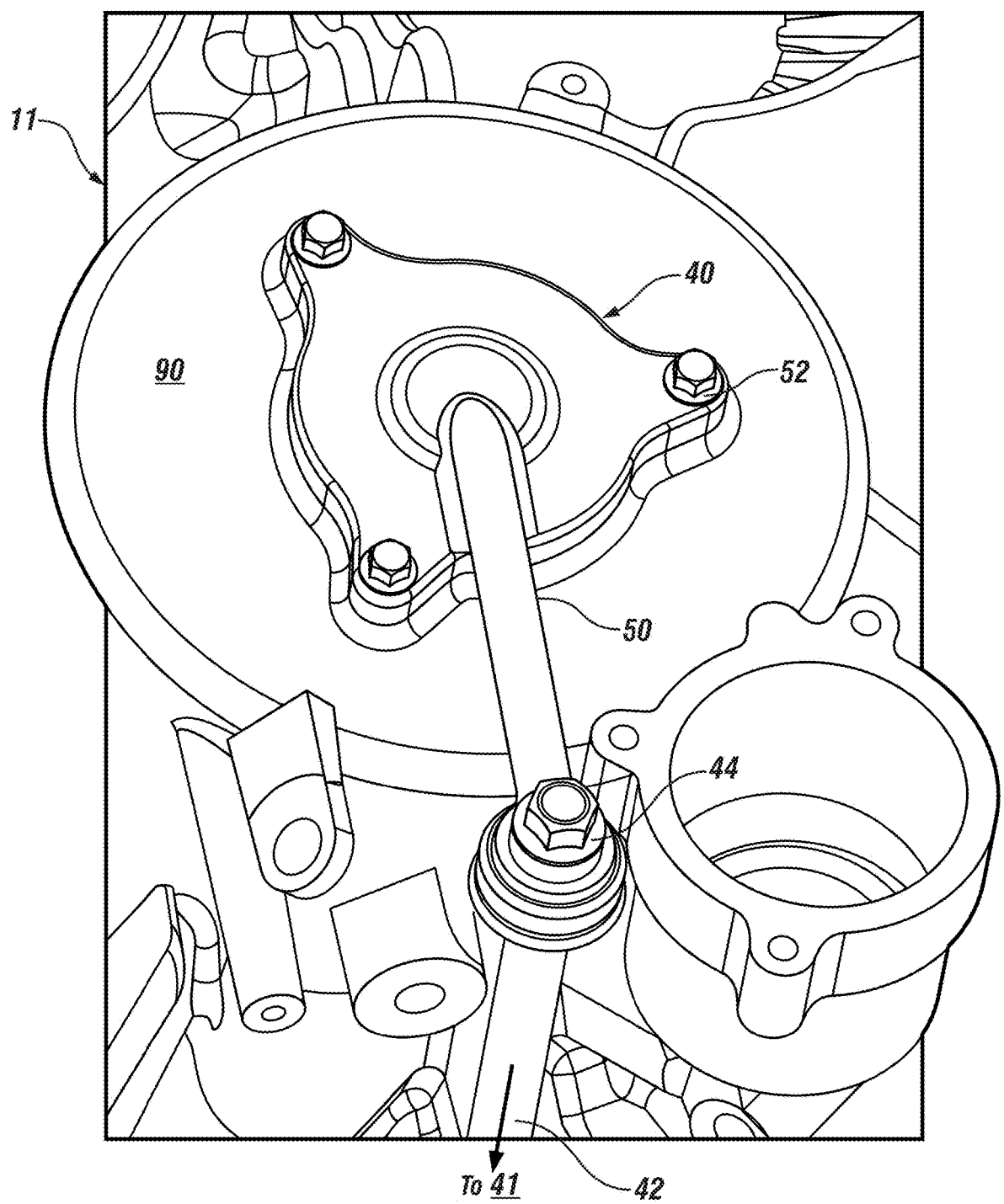
FIG. 5 schematically illustrates an isometric view of a portion of an embodiment of an input split hybrid transmission, in accordance with the disclosure.

FIGS. 4 and 5 schematically illustrate details related to the fluid distribution system 40, which is arranged to distribute pressurized lubricant that originates from the in-house fluidic pump and sump 41.

The fluidic distribution system 40 includes a longitudinal conduit 42 that is arranged within the transmission case 60, a banjo bolt 44, and an externally-disposed fluidic transfer device 46 that fluidly couples to the opening 31 in the first end 30-1 of the first input member 30. The fluidic distribution system 40 is arranged to transfer pressurized fluid originating from the in-house fluidic pump and sump 41 to the first radial conduit 33 that is disposed in the first input member 30, thus supplying pressurized fluid to elements of the planetary gearset 24. The fluidic distribution system 40 is arranged to transfer pressurized fluid originating from the in-house fluidic pump and sump 41 to the one or plurality of second radial conduits 38 that are disposed in the first input member 30, thus supplying pressurized fluid to elements of the transmission including the planetary gearset 24.

The fluidic transfer device 46 is a fabricated device that includes a first portion 48, a hollow radial tube 50, and a cover plate 52. An enclosed flow conduit is formed by the first portion 48, hollow radial tube 50, and cover plate 52.

The longitudinal conduit 42 includes a threaded portion 43, which engages a corresponding threaded shank portion of the banjo bolt 44.

The banjo bolt 44 is an elongated metallic device that includes a head and a hollow shank. The hollow shank has a perforated recessed outer section near the head portion through which fluid is able to flow regardless of the rotational position of the bolt, which enables fluidic flow therethrough without need for rotational alignment of the banjo bolt 44 in relation to the hollow radial tube 50.

The first portion 48 of the fluidic transfer device 46 fluidly couples to the longitudinal conduit 42 via the banjo bolt 44.

The cover plate 52 sealably fits overtop of the opening 31 in the first end 30-1 of the first input member 30 outside of the first side 61 of the transmission case 60.

The fluidic transfer device 46 is arranged to transfer the pressurized fluid from the longitudinal conduit 42 to the opening 31 in the first end 30-1 of the first input member 30 outside of the first side 61 of the transmission case 60.

The cover plate 52 is sealably secured to an outer portion of the first side 61 of the transmission case 60 overtop of the opening 31 in the first end 30-1 of the first input member 30 such that a first end of the hollow radial tube 50 fluidly communicates with the opening 31 of the internal axial conduit 32.

Lubricant is supplied from the pressurized source that originates from an in-house fluidic pump and sump 41 that is fluidly connected to the longitudinal conduit 42. Stated differently, lubricant flows from the pressurized source 41 to one or more elements of the planetary gearset 24 via the longitudinal conduit 42 arranged within the transmission case 60, the banjo bolt 44, the fluidic transfer device 46 including the cover plate 52, the axial conduit 32 disposed within the first rotatable input member 30, and the first radial conduit 33 disposed within the first rotatable input member 30.

Figure 7:
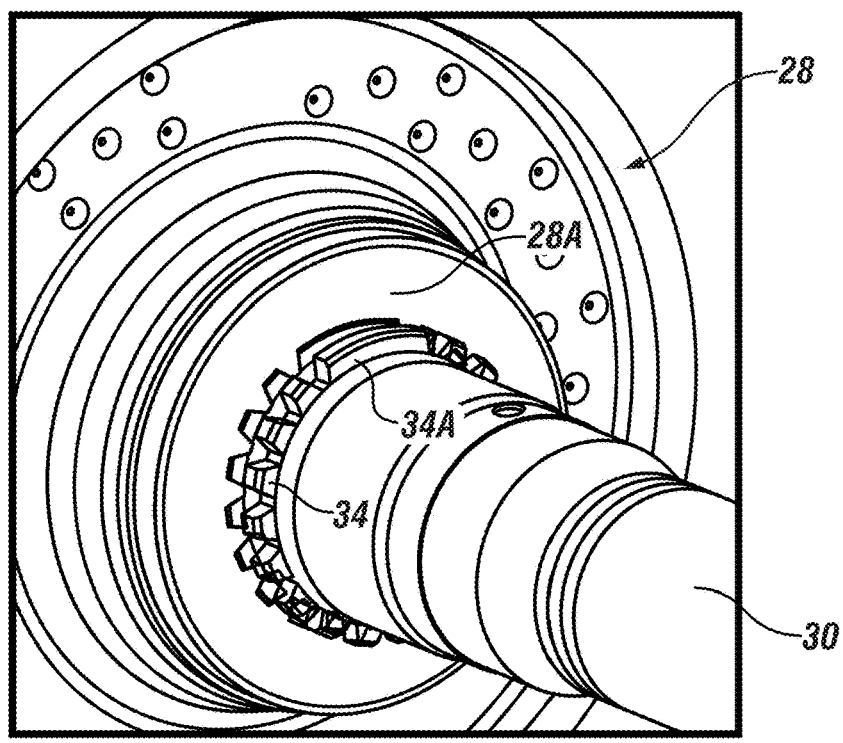
FIG. 7 schematically illustrates an isometric view of a portion of an embodiment of an input split hybrid transmission, in accordance with the disclosure.
Figure 8:
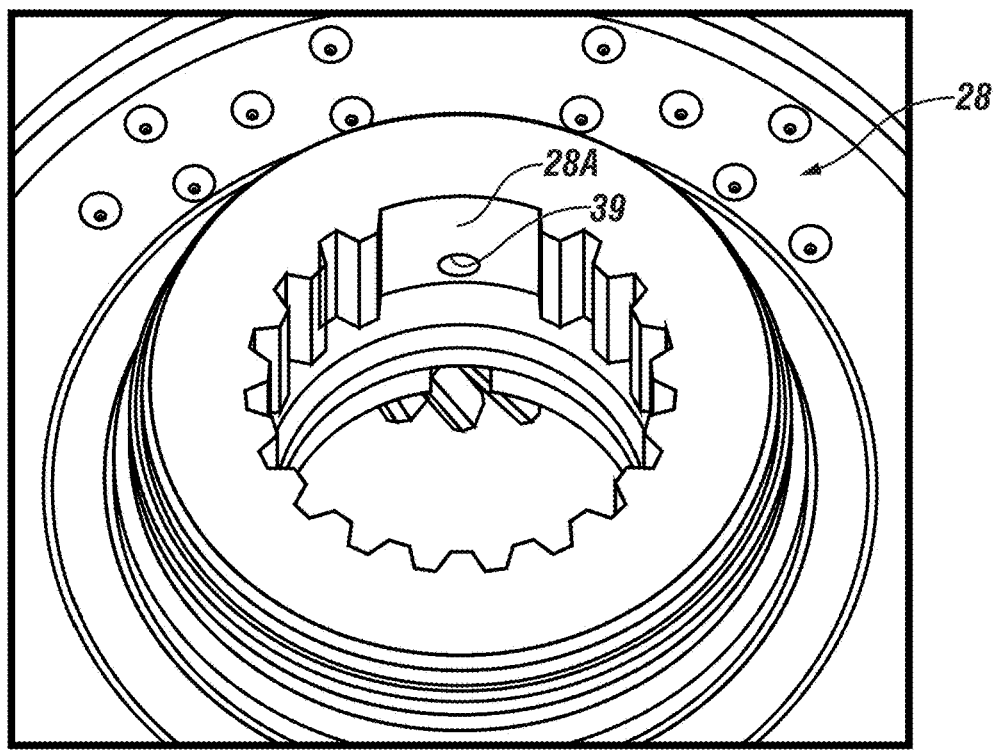
FIG. 8 schematically illustrates an isometric view of a portion of an embodiment of an input split hybrid transmission, in accordance with the disclosure.

FIG. 7 provides an isometric view of a portion of the first rotatable input member 30 and the sun gear 29, with a splined portion 34 being arranged thereon to engage the planetary carrier 28. The splined portion 34 of the first rotatable input member 30 includes an indexed portion 34A having the first radial conduit 33. FIG. 8 provides a corresponding isometric view of a portion of the planetary carrier 28, with a splined portion 28A being arranged thereon to engage the planetary carrier 29. The splined portion 28A of the planetary carrier 28 includes a third radial conduit 39. The splined portion 28A of the planetary carrier 29 intersplines with the splined portion 34 of the first rotatable input member 30.

When the planetary carrier 28 is arranged on the first rotatable input member 30, the first radial conduit 33 aligns with the third radial conduit 39, thus enabling and facilitating flow of lubricating fluid from the axial conduit 32 disposed within the first rotatable input member 30 to the various elements of the planetary gearset 24.

The entire length of the first rotatable input member 30 is used to provide for precise control of lubrication and cooling oil while also providing for the longest possible span between the main bearing piloting features of the shaft. The design provides for feed of lubrication and cooling oil fed from the smallest possible diameter which serves to minimize losses associated with sealing of passages and also providing for centrifugal lubrication along the entire length of the axis.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. An input split hybrid transmission, comprising:
a planetary gearset arranged to transfer mechanical power between an internal combustion engine, a first electric machine, a second electric machine, and an output member;
a transmission case having an outer portion, a first side portion, and an engine side portion; and
a fluidic distribution system;
wherein the planetary gearset includes a sun gear, a plurality of planetary pinion gears arranged on a planetary carrier, and a ring gear;
wherein the planetary carrier is arranged on a first rotatable input member defining a first axis;
wherein the first rotatable input member has an axial conduit disposed therein;
wherein the fluidic distribution system is arranged to supply a lubricant to the planetary gearset via the axial conduit disposed within the first rotatable input members;
wherein the planetary gearset is arranged in the transmission case;
wherein the first rotatable input member extends between the first side portion and the engine side portion, and includes a first end thereof projecting through the first side portion; and
wherein the first end of the first rotatable input member includes an orifice fluidly coupled to the axial conduit disposed therein; and
wherein the fluidic distribution system comprises:
a longitudinal conduit arranged within the transmission case, a banjo bolt, an externally-disposed fluidic transfer device having a cover plate and a radial tube, the axial conduit disposed within the first rotatable input member, and a first radial conduit disposed within the first rotatable input member,
wherein the first radial conduit is in fluidic communication with the axial conduit;
wherein the cover plate is sealably secured to the first side portion of the transmission case overtop of the axial conduit disposed within the first rotatable input member such that a first end of the radial tube fluidly communicates with the axial conduit,
wherein a second end of the radial tube is secured to the transmission case via the banjo bolt such that the second end of the radial tube fluidly communicates with the longitudinal conduit,
wherein the lubricant is supplied from a pressurized source that is fluidly connected to the longitudinal conduit, and
wherein the lubricant flows from the pressurized source to the planetary gearset via the longitudinal conduit arranged within the transmission case, the banjo bolt, the cover plate including the radial tube, the axial conduit disposed within the first rotatable input member, and the first radial conduit disposed within the first rotatable input member.

2. The input split hybrid transmission of claim 1:
wherein the first rotatable input member includes a splined portion;
wherein the axial conduit arranged within the first rotatable input member extends between a first end thereof and the splined portion;
wherein the first rotatable input member includes a first radial conduit, wherein the first radial conduit is arranged between the axial conduit and an outer surface of the first rotatable input member at the splined portion.

3. The input split hybrid transmission of claim 2, wherein the first rotatable input member includes a plurality of second radial conduits that are arranged between the axial conduit and an outer surface of the first rotatable input member that is away from the splined portion.

4. The input split hybrid transmission of claim 2, wherein the splined portion of the first rotatable input member is intersplined with the planetary carrier; and wherein the planetary carrier includes a third radial conduit that aligns with the first radial conduit.

5. The input split hybrid transmission of claim 4, wherein the fluidic distribution system is arranged to supply the lubricant to the planetary gearset via the axial conduit disposed within the first rotatable input member, the first radial conduit, and the third radial conduit.

6. The input split hybrid transmission of claim 1, wherein the fluidic distribution system being arranged to supply the lubricant to the planetary gearset via the axial conduit disposed within the first rotatable input member comprises the fluidic distribution system being arranged to supply the lubricant to one of the sun gear, the plurality of planetary pinion gears, the planetary carrier, and the ring gear via the axial conduit disposed within the first rotatable input member.

7. A transmission for a powertrain system, comprising:
a simple planetary gearset arranged to transfer mechanical power between a first torque generating device, a second torque generating device, a third torque generating device, and an output member;
a transmission case having an outer portion, a first side portion, and an engine side portion, wherein the planetary gearset is arranged in the transmission case; and
a fluidic distribution system;
wherein the simple planetary gearset includes a sun gear, a plurality of planetary pinion gears arranged on a planetary carrier, and a ring gear;
wherein the planetary carrier is arranged on a first rotatable input member defining a first axis;
wherein the first rotatable input member has an axial conduit disposed therein; and
wherein the first rotatable input member extends between the first side portion and the engine side portion of the transmission case, and includes a first end thereof projecting through the first side portion of the transmission case;
wherein the first end of the first rotatable input member includes an orifice fluidly coupled to the axial conduit disposed therein;
wherein the fluidic distribution system is arranged to supply a lubricant to the planetary gearset via the axial conduit disposed within the first rotatable input member; and
wherein the fluidic distribution system comprises:
a longitudinal conduit arranged within the transmission case, a banjo bolt, an externally-disposed fluidic transfer device having a cover plate and a radial tube, the axial conduit disposed within the first rotatable input member, and a first radial conduit disposed within the first rotatable input member,
wherein the first radial conduit is in fluidic communication with the axial conduit,
wherein the cover plate is sealably secured to the first side portion of the transmission case overtop of the axial conduit disposed within the first rotatable input member such that a first end of the radial tube fluidly communicates with the axial conduit,
wherein a second end of the radial tube is secured to the transmission case via the banjo bolt such that the second end of the radial tube fluidly communicates with the longitudinal conduit,
wherein the lubricant is supplied from a pressurized source that is fluidly connected to the longitudinal conduit, and
wherein the lubricant flows from the pressurized source to the planetary gearset via the longitudinal conduit arranged within the transmission case, the banjo bolt, the cover plate including the radial tube, the axial conduit disposed within the first rotatable input member, and the first radial conduit disposed within the first rotatable input member.

8. The transmission of claim 7:
wherein the first rotatable input member includes a splined portion;
wherein the axial conduit arranged within the first rotatable input member extends between a first end thereof and the splined portion;
wherein the first rotatable input member includes a first radial conduit, wherein the first radial conduit is arranged between the axial conduit and an outer surface of the first rotatable input member at the splined portion.

9. The transmission of claim 8, wherein the first rotatable input member includes a plurality of second radial conduits that are arranged between the axial conduit and an outer surface of the first rotatable input member that is away from the splined portion.

10. The transmission of claim 8, wherein the splined portion of the first rotatable input member is intersplined with the planetary carrier; and wherein the planetary carrier includes a third radial conduit that aligns with the first radial conduit.

11. The transmission of claim 10, wherein the fluidic distribution system is arranged to supply the lubricant to the planetary gearset via the axial conduit disposed within the first rotatable input member, the first radial conduit, and the third radial conduit.

12. The transmission of claim 7, wherein the fluidic distribution system being arranged to supply the lubricant to the planetary gearset via the axial conduit disposed within the first rotatable input member comprises the fluidic distribution system being arranged to supply the lubricant to one of the sun gear, the plurality of planetary pinion gears, the planetary carrier, and the ring gear via the axial conduit disposed within the first rotatable input member.

13. An input split hybrid transmission for a powertrain system of a vehicle, comprising:
a simple planetary gearset arranged to transfer mechanical power between an internal combustion engine, a first electric machine, a second electric machine, and an output member coupled to a driveline of the vehicle;
a transmission case having an outer portion, a first side portion, and an engine side portion; and
a fluidic distribution system;
wherein the planetary gearset includes a sun gear, a plurality of planetary pinion gears arranged on a planetary carrier, and a ring gear;
wherein the planetary carrier is arranged on a first rotatable input member defining a first axis;
wherein the first rotatable input member has an axial conduit disposed therein; and wherein the fluidic distribution system is arranged to supply a lubricant to the planetary gearset via the axial conduit disposed within the first rotatable input member;

wherein the planetary gearset is arranged in the transmission case;

wherein the first rotatable input member extends between the first side portion and the engine side portion of the transmission case, and includes a first end thereof projecting through the first side portion of the transmission case;

wherein the first end of the first rotatable input member includes an orifice fluidly coupled to the axial conduit disposed therein; and wherein the fluidic distribution system comprises:
- a longitudinal conduit arranged within the transmission case, a banjo bolt, an externally-disposed fluidic transfer device having a cover plate and a radial tube, the axial conduit disposed within the first rotatable input member, and a first radial conduit disposed within the first rotatable input member,
- wherein the first radial conduit is in fluidic communication with the axial conduit,
- wherein the cover plate is sealably secured to the first side portion of the transmission case overtop of the axial conduit disposed within the first rotatable input member such that a first end of the radial tube fluidly communicates with the axial conduit,
- wherein a second end of the radial tube is secured to the transmission case via the banjo bolt such that the second end of the radial tube fluidly communicates with the longitudinal conduit,
- wherein the lubricant is supplied from a pressurized source that is fluidly connected to the longitudinal conduit, and
- wherein the lubricant flows from the pressurized source to the planetary gearset via the longitudinal conduit arranged within the transmission case, the banjo bolt, the cover plate including the radial tube, the axial conduit disposed within the first rotatable input member, and the first radial conduit disposed within the first rotatable input member.

14. The input split hybrid transmission of claim 13:
wherein the first rotatable input member includes a splined portion;
wherein the axial conduit arranged within the first rotatable input member extends between a first end thereof and the splined portion;
wherein the first rotatable input member includes a first radial conduit, wherein the first radial conduit is arranged between the axial conduit and an outer surface of the first rotatable input member at the splined portion.

15. The input split hybrid transmission of claim 1, further comprising the lubricant being regulated along an entire length of the rotatable input member through use of the axial conduit.

16. The input split hybrid transmission of claim 1, further comprising an in-house fluidic pump and sump, wherein the fluidic pump is fluidly connected to the longitudinal conduit.

17. The input split hybrid transmission of claim 7, further comprising the lubricant being regulated along an entire length of the rotatable input member through use of the axial conduit.

18. The input split hybrid transmission of claim 7, further comprising an in-house fluidic pump and sump, wherein the fluidic pump is fluidly connected to the longitudinal conduit.

19. The input split hybrid transmission of claim 13, further comprising the lubricant being regulated along an entire length of the rotatable input member through use of the axial conduit.

20. The input split hybrid transmission of claim 13, further comprising an in-house fluidic pump and sump, wherein the fluidic pump is fluidly connected to the longitudinal conduit.

* * * * *